Patented Dec. 3, 1940

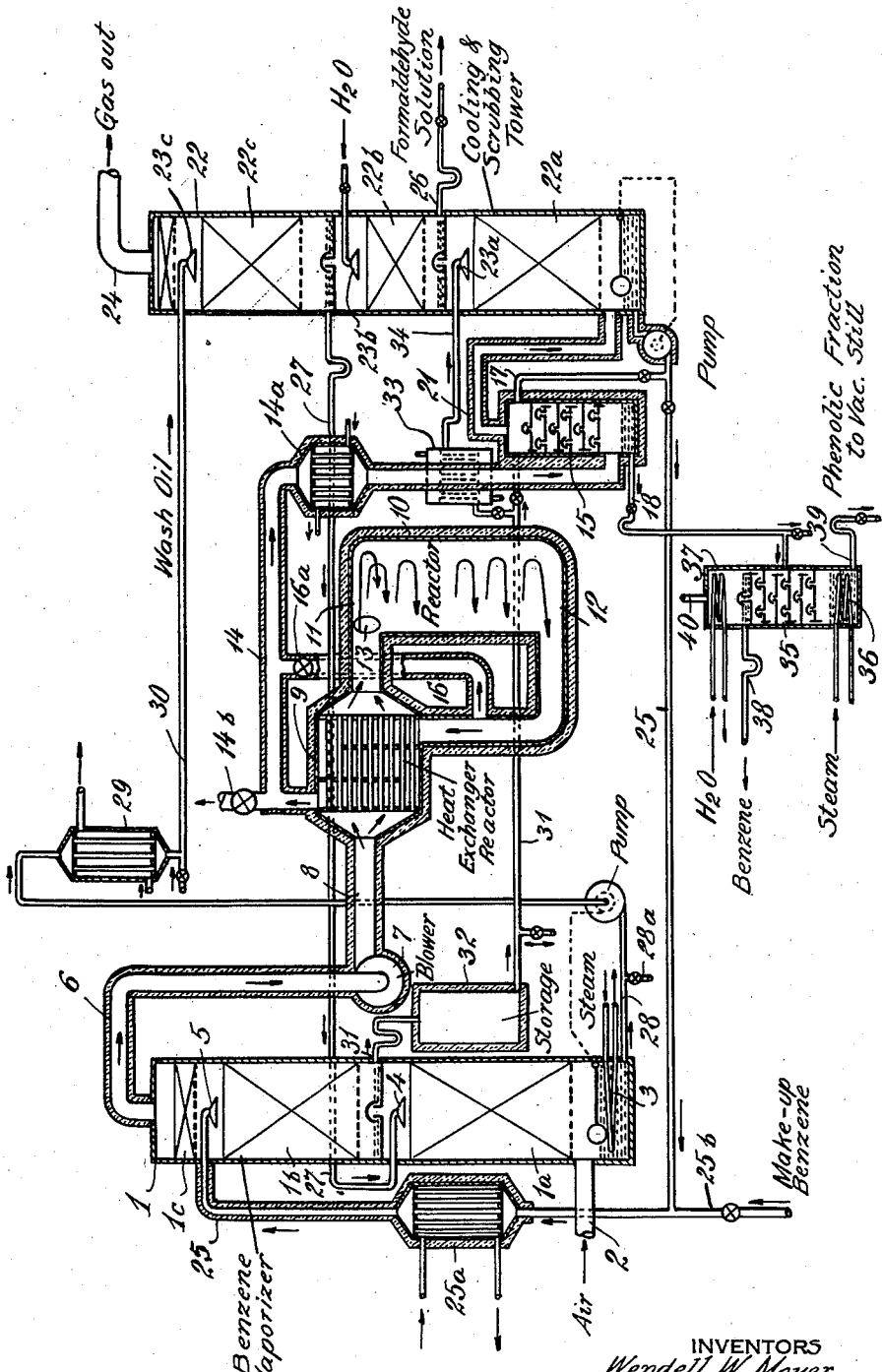

2,223,383

UNITED STATES PATENT OFFICE 2,223,383

OXIDATION OF HYDROCARBONS TO PHENOLS

Wendell W. Moyer, Decatur, Ill., and William C. Klingelhoefer, Syracuse, N. Y., assignors to The Solvay Process Company, New York, N. Y., a corporation of New York Application October 4, 1937, Serial No. 167,252
Renewed November 14, 1939

6 Claims. (Cl. 260—621)

This invention relates to the manufacture of phenols and is particularly directed to improvements in the oxidation of benzene and toluene in vapor phase whereby relatively high yields of the phenols may be produced.

In the past numerous efforts have been made to control the oxidation of benzene so as to produce phenol directly therefrom. A wide variety of methods has been proposed, none of which has been sufficiently successful to result in the production of commercial yields of phenol. Many catalysts have been tried for vapor-phase catalytic oxidation of benzene in the hope that a process might be found whereby phenol could be obtained in an efficient and economical manner. In the Journal of Industrial and Engineering Chemistry of March 1920, pages 228 to 232, investigations covering the vapor phase catalytic oxidation of benzene employing contact masses composed of metals and metal oxides as oxidation catalysts are described. According to the article these experiments resulted in the conversion of only .2% to .3% of the benzene to phenol. Besides the various solid catalysts which have been tried, liquid and gaseous oxidation catalysts have been employed. U. S. Patent 1,547,725 to Carlisle H. Bibb discloses a process of the latter type wherein nitrogen oxides or nitric acid vapor are employed to improve the phenol yield.

We have now found that phenol may be produced in substantial yields by vapor phase oxidation of benzene provided metallic or metal oxide catalyst masses or gaseous catalysts, such as nitrogen oxides, are absent from the reaction chamber. It does, indeed, seem remarkable that despite the extensive work done on catalytic oxidation of benzene no one should have made the discovery that the advantages they sought lay in the omission of the catalyst and reduction of contact surfaces to a minimum. Yet, as far as we are aware, such has been the case. Similarly, we have found that toluene under like conditions yields substantial proportions of cresols and ditolyl.

In accordance with the process of the present invention a mixture of benzene or toluene vapor and oxygen-containing gas in a mol or volume ratio between .02 and .8 part of oxygen per part of hydrocarbon (corresponding to .1 to 4 parts air to 1 part benzene) is heated, by passage through a reaction chamber, to a temperature between 325° and 800° C. The rate of throughput of the mixture and consequent time of contact may be varied within wide limits, according to temperature and pressure employed. It has been found that as a fundamental requirement of satisfactory operation, a maximum reaction time S (in seconds) calculated from the following equation should not be exceeded $$S = \text{antilog}_{10}\left(\frac{7220}{T} - 5.73 - \log_{10} P\right)$$

where T equals the absolute temperature in degrees Kelvin and P equals absolute pressure in atmospheres. The optimum time of reaction is usually about a tenth of this maximum permissible reaction time. From the equation it will be observed that time, temperature and pressure are correlated, and variation in pressure permits corresponding variation either in time or in temperature or in both time and temperature. For operation at lower temperatures in the above range, the optimum time of reaction as estimated from the above relations would be undesirably long at atmospheric pressure, and moderately elevated pressures may be employed in order to permit realization of the reaction in suitably proportioned equipment. In general, space velocities between 50 and 10,000 volumes of gas (calculated for 0° C. and 1 atm.) per hour per volume of reaction space may be used within the temperature range of 450° to 800° C. For example, at 450° C. and with space velocity of 50 per hour, an operating pressure of about 8 atmospheres may be employed to give good conversion. These conditions correspond to a reaction time of about 230 seconds.

It will be apparent from the above equation that at any given pressure the time required increases with decrease of reaction temperature. At temperatures below about 450° C. the reaction time at normal pressure becomes inordinately long so that higher than atmospheric pressures are preferable. Thus at 400° C. a pressure of 100 atmospheres or more is desirable and at 300° C. a pressure around 1000 atmospheres. Even at temperatures as high as 550° C. superatmospheric pressures on the order of 10 atmospheres are advantageous.

Preferably a volume ratio of air to hydrocarbon vapor between .5 and 1.5 is employed. It has been found that higher ratios tend to cause irregularity of control and produce correspondingly lower yields of phenols and greater losses in the form of combustion products, tar, etc. Lower ratios on the other hand give correspondingly lower yields of phenols because of lack of available oxygen. The preferred temperatures at ordinary pressure vary somewhat with space velocity. Thus with space velocities around 100, temperatures between 500° and 700° C. have been found most suitable, whereas at space velocities around 1000 a temperature between 600° and 800° C. is preferable. For the lower space velocities temperatures of 550° to 650° C. are particularly suitable.

The Bibb patent, above referred to, discloses rather similar conditions of reaction as far as temperature and reaction time are concerned. We have found, however, that not only does the reaction proceed satisfactorily without the catalyst which Bibb indicates to be essential, but that higher yields are obtainable in the absence of such catalyst. Thus in comparative tests, conversion efficiencies $$\left(\text{where conversion efficiency}=\frac{\text{mols phenol formed}}{\text{mols benzene attacked}}\right)$$

on the order of 50% (in some instances as high as 60%) were obtained without the catalyst with yields of phenol varying between 4% and 8% of theoretical per pass of benzene through the reaction chamber, but with nitric acid employed as the catalyst, the conversion efficiencies were substantially lower. This difference is illustrated by the following runs: A, without a catalyst; B, with .04% HNO₃ vapor as catalyst. A glass reaction tube 66 cm. long and having a volume of 750 cc. was used. The temperature of the reaction tube was 650° C., the space velocity, 200, and the mol ratio of benzene to air, 1:1 in both cases.

A

| | Per cent |
|---|---|
| Benzene converted to phenol | 4.05 |
| Benzene converted to gas | 3.30 |
| Benzene converted to residue after phenol distillation | 1.01 |
| Conversion efficiency (as above defined) | 48 |

B

| | |
|---|---|
| Benzene converted to phenol | 4.17 |
| Benzene converted to gas | 4.70 |
| Benzene converted to residue after phenol distillation | 3.30 |
| Conversion efficiency (as above defined) | 34.2 |

Toluene on the other hand gave, in a run using a 1:1 toluene-air ratio, a temperature of 650° C., and time of 12 seconds, around 4 parts crude ditolyl, 3 parts cresols, 1 part benzaldehyde, 0.15 part benzoic acid, and 4 parts unidentified products.

The process of the present invention may be carried out at ordinary atmospheric pressure or higher or lower pressures. Since at higher pressures lower temperatures may be employed and since at lower temperatures the deleterious effects of catalytic materials such as steel are lessened, the use of higher than atmospheric pressure permits more latitude in selecting materials for the reaction zone.

The reaction chamber should be constructed to provide the desired temperature control with preferably a minimum of surface exposed to the gas mixture. If the surface if reduced to a minimum, the catalytic effect thereof may not be appreciable even though a catalytic material is employed, and so with a properly designed reactor the material of construction may be selected with a view to low cost and efficient heat transfer rather than minimum catalytic effect. However, it has been found generally preferable to employ for the interior of the reactor, non-porous surfaces of fluid or vitreous materials such as glass, vitrefied brick, porcelain, fused silica, fused aluminum oxide, boron oxide, or the borates, silicates, phosphates, chlorides, or sulfates of the alkali or alkaline earth metals, and/or aluminum; most satisfactory are surfaces free from metals having an atomic number above twenty. When such coatings are employed, it is not so necessary that a minimum of contact area be exposed since these materials have little if any deleterious effect upon the reaction.

Even materials which in finely divided or highly porous form serve as oxidation catalysts may be used in fluid or fused form without exerting any appreciable catalytic effect on the reaction. Thus, although boron oxide has been previously suggested for use as an oxidation catalyst, we have found that this material, if employed at high temperatures, at which it is more or less fluid, does not affect the reaction and the amount of boron oxide present in the reaction chamber in this form may be varied over wide limits without varying appreciably the nature or rate of reaction. Accordingly, where in the appended claims reference is made to catalytic contact masses, masses composed of catalytic substances in sufficiently finely divided or sufficiently porous form to substantially affect the reaction are meant.

A reaction zone defined by aluminum or an alloy which under the operating conditions possesses a surface layer containing substantial amounts of aluminum oxide, for instance steels coated with aluminum by dipping, spraying, or calorizing have been found to be especially satisfactory.

In application Serial No. 346,999, filed July 23, 1940, in the name of Wendell W. Moyer as a continuation-in-part of this application, there is claimed the feature described herein of effecting the oxidation of hydrocarbons to phenols in vapor phase in a reaction zone exposed surfaces of which comprise fused boron oxide.

In addition to phenol, the oxidation of benzene by the process of the present invention results in the formation of small quantities of diphenyl, naphthalene, formaldehyde, and terphenyl as reaction products. However, by means of the present invention, the total quantity of by-products may be kept low as demonstrated by the high recovery of phenol. Toluene yields as the major reaction products cresol and ditolyl and as minor products benzaldehyde and benzoic acid. The reaction products may be separated from the reaction gases individually or collectively in any suitable manner. Thus all of the products may be recovered by condensation or the acidic products may be scrubbed from the gases by means of alkali, for instance sodium hydroxide solution, first and the gases then may be cooled to recover remaining constituents.

It has been found that the above conditions of operation are reflected in the composition of the gaseous reaction products, which normally will contain in free form more than 5%, preferably more than 10%, of the original free oxygen content of the air and 80% to 90% of the initial hydrocarbon as such. It is desirable in any event in the case of benzene, to maintain a sufficiently rapid flow of the mixture through the reaction zone so that the gases leaving the zone contain a benzene to phenol ratio of at least 4 to 1.

There follows an example of one embodiment of the present invention as applied to benzene. In the accompanying drawing the numeral 1 designates a contact tower containing suitable packing and arranged for introducing benzene into air to be employed in the process. The tower may be constructed of any convenient material, steel for example, and the packing may be of similar or dissimilar material.

The tower 1 is provided with a lower section 1a for stripping benzene from an oil-benzene solution and an upper section 1b for saturating the air with additional benzene. At the bottom of the tower an air inlet 2 is provided so that air introduced into the tower passes up therethrough counter-current to descending streams of oil and benzene in section 1a and benzene in section 1b. Each of these sections may be provided with suitable packing to assure adequate surface contact of the liquid with the gas. At the bottom of the tower a steam coil 3 may be arranged for heating oil and exhausting it of its benzene content. Hot benzene-oil mixture is introduced into section 1a by means of spray head 4 and benzene is introduced into section 1b by means of spray head 5. An additional packed section 1c may be arranged at the top of the tower for removing any entrained spray from the gas. From the top of the tower 1 gas conduit 6 leads to blower 7 adapted to force the air-benzene vapor mixture through the system. Blower 7 is connected by conduit 8 to a heat exchanger 9 which serves as the initial section of the reaction chamber. This heat exchanger is shown as a tubular interchanger of the indirect type which may be constructed of a material such as aluminum-coated chromium-iron. However, any suitable construction may be employed. Heat exchanger 9 is connected directly to a reaction chamber 10 of any suitable type such as to provide the required reaction time while exposing the gases to a minimum of contact surface. The reactor illustrated comprises a cylindrical chamber having a tangential inlet 11 and tangential outlet pipe 12 so that the gases are given a spiral motion and hence any dead spots are avoided and the gas moves progressively through the reactor. A steel vessel lined with ceramic material such as fused silica may be used. At the top of the reaction chamber a gas inlet pipe 13 is shown for introducing combustion gas or other heating medium for initially bringing the reaction chamber to operating temperature. Pipe 12 leads directly from the reactor into the hot side of preheater 9 which thus serves to transfer heat from the reaction products to the ingoing reaction mixture.

Conduit 14 leads from the hot side of the interchanger 9 through a cooler 14a, cooled by any suitable fluid and arranged to give uniform temperature control, to the bottom of a conventional bubble tray column 15. Outlet pipe 14b is provided for drawing off the hot gas used for initially heating the reactor. Between pipes 12 and 14 a by-pass 16 having a regulating valve 16a is arranged to shunt the heat exchanger 9 so as to control the temperature in the reaction zone within the desired range.

Column 15 has an inlet 17 for benzene at the top and an outlet 18 for condensate at the bottom. Gas conduit 21 leads from the top of the bubble tray column to the bottom of a scrubbing tower 22.

Scrubbing tower 22 comprises a lower section 22a wherein the gases are cooled by countercurrent contact with benzene, a section 22b wherein the cooled gases are washed with water for removal of formaldehyde, and a section 22c wherein the cooled gases are finally scrubbed with wash oil such as the straw oil employed for absorbing benzene from coke oven gases. The several sections of the tower are provided with suitable packing and spray heads 23a, 23b, and 23c for introducing the scrubbing fluids. From the top of the scrubbing tower gas conduit 24 leads to suitable gas disposal means. Since the gas resulting from the process has some fuel value, it may be used for various heating purposes. Column 15 and tower 22 may be constructed of the materials usually employed for such units.

From the bottom of section 22a of the scrubbing tower pipe 25 leads through a heat exchanger 25a to spray head 5 in tower 1; branch 17 leads to the top of column 15. A valved inlet 25b for make-up benzene is provided on this line. At the bottom of section 22b a pipe 26 is provided for drawing off aqueous formaldehyde solution. Arrangement may be made for recirculating this solution to build up its formaldehyde content if desired. However, straight countercurrent circulation provides a more satisfactory recovery. From the bottom of section 22c a pipe 27 leads to spray head 4 in section 1a of tower 1.

Tower 1 at its bottom has a liquid outlet pipe 28 provided with a valved outlet branch 28a. Pipe 28 leads to cooler 29 connected to oil inlet pipe 30 of scrubbing section 22c. From section 1b of tower 1 outlet pipe 31 leads to storage tank 32 and thence to the top of bubble tray column 15 and also to a heat exchanger 33 from which the pipe line 34 leads to spray head 23a of section 22a.

Outlet pipe 18 from column 15 leads to the center of a distillation column 35. This column may be of conventional construction having a heating coil 36 at the bottom and a cooling coil 37 at the top and outlets 38 and 39 at the top and bottom respectively for withdrawal of distillate and distillation residue. Vapor outlet 40 is provided for exit of any uncondensed gases.

It should be understood that where steel is employed in the apparatus above described, alloy steels of low corrosion resistance, such as the chromium or chromium nickel steels, or simple carbon steels may be used.

While contact devices of the packed tower type have been illustrated in the drawing, other contact means may be used to advantage. Thus spray contact devices of low pressure drop, such as the spray roll contact apparatus of United States Patent 1,958,586 of Stuart Parmelee Miller, or the various contact apparatuses of Miller Patent 1,958,440 may be employed to particular advantage because of their high efficiency and low operating cost. When such an apparatus is employed, it may be advantageous to provide the requisite heating or cooling coils for heating or cooling the gases within the spray chamber itself, say at the bottom thereof, so that efficient heat exchange is obtained.

The apparatus illustrated may be operated for the production of phenol from benzene in the following manner.

Air enters tower 1 by means of inlet 2 and passes up through section 1a countercurrent to a flow of benzene and stripping oil mixture whereby the air vaporizes the benzene from the mixture. The air and benzene-oil mixture both enter section 1a at about 30° C. and it is desirable that the air enter the benzene vaporizing section 1b at a temperature around 50° C. or 60° C. Oil collecting at the bottom of the tower may be heated by steam coil 3 in order to further remove benzene, and the resultant oil freed of the benzene may be returned by pipe 28 to cooler 29 for reuse as stripping oil in a manner to be hereinafter described. By regulating the heating of the body of oil a portion of the oil may be vaporized to supply the necessary heat for raising the temperature of the air and also for vaporizing the benzene. The oil vaporized will be cooled by the air and condensed and will return to the bottom of the tower.

The air containing vapors of benzene from the benzene-stripping oil mixture next passes through section 1b of tower 1 where it contacts countercurrently with benzene introduced through spray head 5 and preheated in preheater 25a to a temperature around 60° C. The benzene may be a crude product containing the impurities normally associated therewith as it has been found that such impurities do not adversely affect the reaction. In this manner a mixture of air and benzene vapor in about equimolecular proportions is produced at a temperature around 55° C. or 60° C. Excess benzene, not vaporized by the air, passes out at the bottom of section 1b through pipe 31 to storage tank 32. Air-benzene vapor mixture drawn by pump 7 at a rate such as to give a space velocity of 350 or thereabouts in that part of the heat exchanger 9 and reactor 10 maintained above 500° C. (corresponding to a reaction time of about 2½ to 3½ seconds) passes to heat exchanger 9 where its temperature is raised to about 600° C. The mixture then enters reactor 10 where by the heat of reaction it is further heated to about 800° C. At 800° C. the reaction mixture enters the hot side of heat exchanger 9 and gives up its heat to ingoing mixture thus being cooled to about 260° C.

The reaction mixture is further cooled in heat exchanger 14a to about 85° C. and enters column 15 at this temperature. In column 15 the reaction mixture passes upwardly countercurrent to a flow of benzene, which is introduced at the top of the tower at a temperature around 40° C. This benzene may be supplied either from storage tank 32 by way of pipe 31 or from tower 22 by way of pipe 25 and branch pipe 17. The contact of the reaction gas mixture with the cooler benzene results in the condensation or absorption of phenol, diphenyl, naphthalene, and other materials relatively high-boiling, compared with the benzene. It is preferred to control the entering gas temperature and the entering benzene temperature and the amount of benzene supplied so as to cool the gases to a temperature of about 58° C. and heat the benzene to about 85° C. A benzene condensate mixture is thus obtained containing about 50 mol percent of benzene. This mixture may be caused to flow through pipe 18 to a distillation column 35 for separation of benzene from high-boiling constituents. It will be noted that while column 35 is shown as separate and independent from column 15, it may be combined therewith, if desired, forming a lower section of column 15. The phenolic residue, consisting of 80 parts phenol and the balance diphenyl, naphthalene, and other products perhaps resulting from the condensation of phenol with formaldehyde present in the reaction gases, may be withdrawn from the bottom of column 35 and conducted to a vacuum still (not shown) for recovery of phenol therefrom. The benzene recovered may be returned to the system for further use.

The reaction gases pass from the top of column 15 to scrubbing tower 22. Here they first are brought into intimate contact countercurrently with benzene introduced through spray head 23a. This benzene may be drawn by way of pipes 31 and 34 from storage tank 32 or partly or entirely from some other source, as the fresh benzene supply, but is preferably introduced into section 22a of the tower at a temperature around 29° C. Sufficient benzene should be introduced to cool the gas mixture down to about 30° C., additional benzene being supplied, if required, for this purpose. By this cooling of the gases the major portion of the benzene is condensed and collected at the bottom of section 22a from whence it may be conducted by means of pipe 25 back through preheater 25a to spray head 5 and after the addition of make-up benzene through branch 25b, if necessary. Whether this addition will or will not be necessary in any particular case of course depends upon whether additional benzene has been supplied through pipe 31 and also whether benzene from the bottom of section 22a is being used for supplying column 15.

It will be noted that any constituents such as phenol, diphenyl, etc. not recovered in column 15 will be washed out from the gases with the benzene in section 22a. By supplying benzene from this section to the column 15, any such constituents contained will be recovered along with the phenol, diphenyl, etc. condensed from the gases in this column. A similar result eventually takes place with benzene circulated back to tower 1 by way of return pipe 25. Even if such constituents are vaporized in section 1b, their relaitve proportion in the gas mixture will be negligible compared with the quantities produced by the reaction and consequently they will pass along through the system without any substantial effect upon its operation.

Reaction gases cooled to a temperature around 30° C. in section 22a, pass into section 22b where they are washed countercurrently with water for removal of formaldehyde. The amount of water is controlled to produce a solution of about 10% formaldehyde concentration. The resultant formaldehyde solution is drawn off through pipe line 26. The gases then pass up through section 22c where they are washed countercurrently with wash oil introduced through spray head 23c. This oil may be a petroleum distillate fraction such as the straw oil commonly employed at coke oven plants for recovering benzene. The wash oil should be introduced at as low a temperature as possible in order to effect a maximum elimination of benzene from the gases. Fresh wash oil and wash oil recovered from the bottom of section 1a of tower 1 and cooled in heat exchanger 29 to a temperature of about 30° C. or lower may be used advantageously. In this way the benzene content of the exit gases can be reduced to as low as .1% or lower. Analyses have shown such gases to contain on the order of 15% carbon monoxide together with a few percent of hydrogen, methane, and ethylene. Consequently these gases possess appreciable heating value and can be used for heating purposes.

Where in the appended claims the oxidation of both benzene and toluene is defined, the term "phenol" is employed in its generic sense to include cresol. In claims relating to oxidation of benzene only the term has been employed in its specific sense to designate the compound $C_6H_5OH$.

We claim:

1. The method of producing phenol from benzene, which comprises passing a mixture of benzene vapor and air in a volume ratio of air to benzene vapor between 0.5 and 1.5 through a reaction zone maintained at a temperature between 450° C. and 800° C., said zone being devoid of catalytic contact masses and gaseous oxidation catalysts, and regulating the relation of velocity, temperature, and pressure so that not more than 20% of the benzene is attacked and the ratio of benzene to phenol in the mixture leaving said zone is at least 4 to 1.

2. The method of producing phenol from benzene, which comprises passing a mixture of benzene vapor and air in a volume ratio of air to benzene vapor between 0.1 and 4 through a reaction zone maintained at a temperature between 325° C. and 800° C. said zone being devoid of catalytic contact masses and gaseous oxidation catalysts, separating reaction products from the reaction gases, and washing the remaining gases with a cold oil of low volatility to remove unreacted benzene from said gases.

3. The method of producing phenol from benzene, which comprises passing a mixture of benzene vapor and air in a volume ratio of air to benzene vapor between 0.1 and 4 through a reaction zone maintained at a temperature between 325° and 800° C. said zone being devoid of catalytic contact masses and gaseous oxidation catalysts, separating reaction products from the reaction gases, washing the remaining gases with a cold wash-oil of low volatility to remove unreacted benzene from said gases, and bringing the oil-benzene mixture while hot into contact with air to remove benzene and thereby regenerate the wash-oil and form a gas vapor mixture suitable for use in forming further quantities of phenol in the aforesaid manner.

4. The method of producing a phenol from a hydrocarbon of the group consisting of benzene and toluene, which comprises reacting the hydrocarbon with molecular oxygen by passing a mixture of the hydrocarbon and $O_2$-containing gas in proportions such that the mol ratio of $O_2$ to hydrocarbon is between 0.02 and 0.8 through a reaction zone, said zone being devoid of catalytic contact masses and gaseous oxidation catalysts, and controlling the relation of gas velocity and reaction temperature and pressure so that not more than 20% of said hydrocarbon is attacked and more than 5% of the $O_2$ in said gas remains in molecular form.

5. The method of producing phenol from benzene, which comprises passing a mixture of benzene vapor and $O_2$-containing gas in proportions such that the mol ratio of $O_2$ to benzene is between 0.02 and 0.8 through a reaction zone maintained at a temperature of at least 325° C., said zone being devoid of catalytic contact masses and gaseous oxidation catalysts, and maintaining the relation of gas velocity and reaction temperature and pressure so that a small percentage less than 20% of the benzene is attacked and the ratio of benzene to phenol in the mixture leaving said zone is at least 4:1 and more than 10% of the $O_2$ in said gas remains in molecular form.

6. The method of producing phenol from benzene, which comprises passing a mixture of benzene vapor and $O_2$-containing gas in proportions such that the mol ratio of $O_2$ to benzene is between 0.02 and 0.8 through a reaction zone maintained at a temperature between about 600° C. and about 800° C., said zone being devoid of catalytic contact masses and gaseous oxidation catalysts, and maintaining the relation of gas velocity and reaction temperature and pressure so that a small percentage less than 20% of the benzene is attacked and the ratio of benzene to phenol in the mixture leaving said zone is at least 4:1 and more than 10% of the $O_2$ in said gas remains in molecular form.

WENDELL W. MOYER.
WILLIAM C. KLINGELHOEFER.